July 19, 1960      R. B. SOLDINI      2,945,684
PRE-BATCH TRAILER FOR CONCRETE MAKING INGREDIENTS
Filed March 31, 1958      2 Sheets-Sheet 1
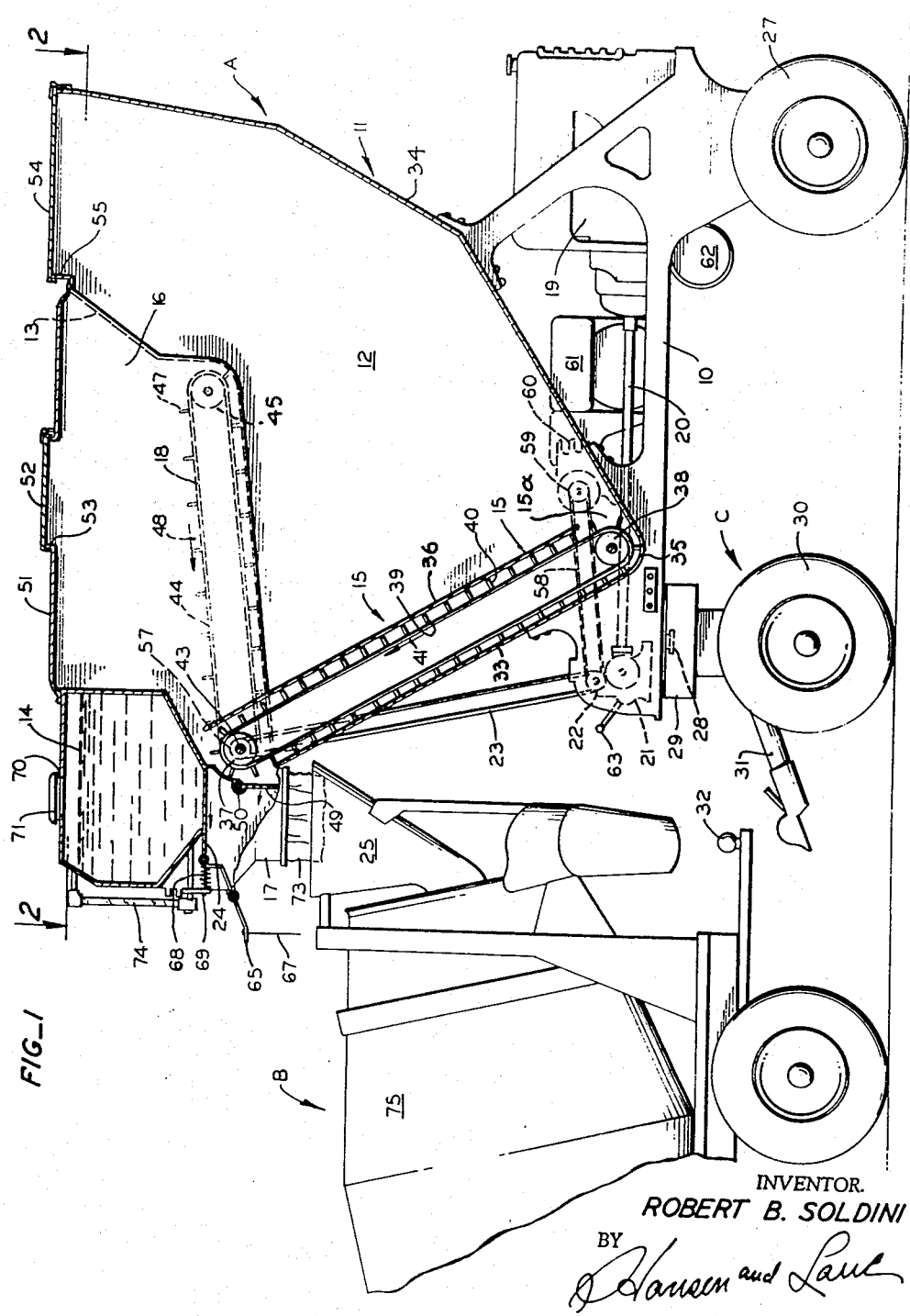
FIG_1
INVENTOR.
ROBERT B. SOLDINI
BY
ATTORNEYS

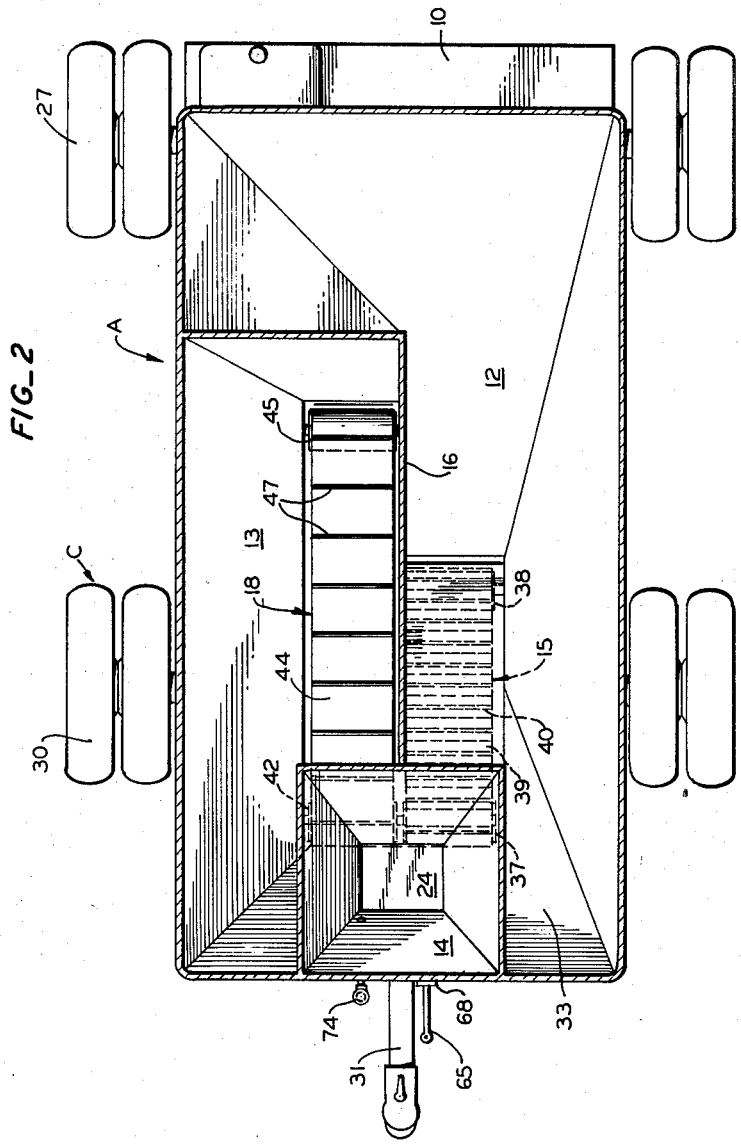

2,945,684

PRE-BATCH TRAILER FOR CONCRETE MAKING INGREDIENTS

Robert B. Soldini, 13 Corte Dorado, Millbrae, Calif.

Filed Mar. 31, 1958, Ser. No. 724,966

4 Claims. (Cl. 259—165)

The present invention relates to concrete batch apparatus, and pertains more particularly to a trailer for transporting pre-measured quantities of cement making ingredients from a batching plant to a remote job site, and for discharging such materials simultaneously as required into a mixer, such as a mixing truck used to haul the trailer from the batch plant to the job site.

It is current practice, at least throughout the United States, to erect large concrete batching plants at strategic points in and about metropolitan and other areas in which large concrete building operations are in progress, and to transport metered batches of concrete making materials from the batching plant to a job site in mixing trucks which mix the concrete while the truck is in transit from the batching plant to the job site.

This is a very efficient and effective method of providing concrete to a job site located within a reasonably short distance of the batching plant. However, when the haul from the batching plant to the job is greater than, for example, three or four miles, the per yard cost of the delivered cement increases rapidly, due to the larger number of mixing trucks required to supply corresponding concrete requirements, and to the greater trucking costs inherent in the longer haul required.

The present invention contemplates the provision of a pre-batch trailer which is adapted to carry, in separate compartments, the pre-measured ingredients for a batch of concrete. This trailer is provided with means for delivering the batch ingredients into a mixer, which may be a mixing truck used to haul the trailer to its destination, after such mixing truck has discharged its own load of mixed concrete.

A further object of the invention is to provide an improved, pre-batch trailer for transporting the ingredients of a batch of concrete to a job site, and for discharging such ingredients into a mixer.

These, and other objects and advantages of the invention, will be apparent from the following description and the accompanying drawings, wherein:

Fig. 1 is a side elevational view of a pre-batch trailer embodying the present invention in the act of discharging its contents into the receiving hopper of a concrete mixing truck, the near side of the trailer body being broken away.

Fig. 2 is a sectional view taken along line 2—2 of Fig. 1.

Briefly, the invention is illustrated as being embodied in a trailer A comprising a chassis 10 with a box-like body 11 mounted thereon. The body 11 is divided into an aggregate compartment 12, and a cement compartment 13. The compartments 12 and 13 are separated from each other by a dust-tight partition 16. A water tank 14 is provided forwardly of the cement compartment 13.

An elevator 15 is mounted to elevate aggregate from the bottom of the aggregate compartment 12 and to discharge it into a discharge spout 17, which is mounted at a height to discharge into a mixer such as a concrete mixing truck B. A conveyor 18 is also mounted to simultaneously convey cement from the cement compartment 13 into the spout 17. The elevator 15 and conveyor 18 are driven by suitable drive means, such as a gasoline engine 19 mounted on the chassis 10 and driving through a drive shaft 20, reduction gearing 21 and belt 23.

A valve 24 is provided in the bottom of the water tank 14 to control the release of water from the latter into the discharge spout 17.

Referring to the drawings in detail, the chassis 10 is provided with conventional rear support wheels 27 and has a conventional king pin 28 beneath its forward end for interlocking engagement with a "fifth wheel" 29 of a type commonly employed as a towing hitch on commercial truck-trailers. The "fifth wheel" 29 is incorporated in an assembly C of a type commonly employed for converting a two-wheel to a four-wheel trailer. The assembly C has a pair of support wheels 30 journaled thereon, and also is provided with a conventional trailer tongue or hitch 31, which is adapted, by means of a conventional ball type trailer hitch 32 for towing connection to the concrete mixing truck B.

The trailer body 11 is of suitable construction, and may be fabricated of metal plate. The aggregate compartment 12 has front and rear walls 33 and 34 which slope toward a rounded sump 35 in the bottom thereof so that aggregate materials, not shown, contained in the aggregate compartment 12 will gravitate toward and into the sump for elevating by the elevator 15.

The elevator 15 is enclosed, except for an inlet opening 15a at its lower end, by a metal shield or tunnel like enclosure 36, which shields it from aggregate materials, not shown, stored within the compartment 12.

The elevator 15 may be of any suitable type, and is herein illustrated as comprising a power driven head roller 37, and a freely rotating lower roller 38. A conventional belt 39, such as, for example, one of rubber and canvas construction, is passed around the rollers 37 and 38, and is provided with conventional flight plates 40 which elevate aggregate material entering the inlet 34 as the elevator travels in the direction of the arrow 41. The aggregate materials raised by the elevator 15 are discharged at the upper end of the elevator into the discharge spout 17.

A second head roller 42 for the cement conveyor 18 (Fig. 2) may be similar to the elevator head roller 37, and is secured coaxially upon the same shaft 43 as the elevator head roller 37. A cement discharging conveyor belt 44 is passed around this second head roller 42, and also around a tail roller 45 journaled for free rotation at the rear of the cement compartment 13. The conveyor belt 44 has flight plates 47 mounted thereon similarly to those on the elevator 15, so that upon driven rotation of the shaft 43, the cement conveyor belt 44 will move in the direction of the arrow 48 (Fig. 1) to discharge the contents of the cement compartment 13 into the discharge spout 17 simultaneously with the discharge of aggregate from the compartment 12.

A dust-tight closure gate 49 is secured to a shaft 50 journaled on the body 11 to close the opening from the cement compartment 13 into the discharge spout 17. The gate 49 is closed when the trailer A is in transit so as to prevent loss of cement during such time. No such gate is required for the aggregate, since the latter cannot work its way up within the elevator enclosure shield 35 when the elevator is stationary.

A housing 51 is provided over the cement compartment 13, and a hinged hatch plate 52 is provided over a filling hatch 53 provided therein. A hinged cover plate 54 also may be provided if desired over a filling opening 55 for the aggregate compartment 12, although in ordinary weather it is not necessary to keep this second cover plate closed.

The illustrated drive mechanism for the elevator 15 and conveyor 18 comprises a conventional, stationary type gasoline engine 19. The drive shaft 20 extends from the engine 19 to the conventional, speed reducing gear-box 21. From one side of a double pulley 22 on the gear-box, a V-belt 23 passes in driving relation around a pulley 57 on the head shaft 43, which shaft is common to both the elevator and conveyor head rollers 37 and 42.

A second V-belt 58 passes around the other half of the double pulley 22 and also around a pulley 59 on a conventional air compressor 60 mounted on the chassis 10. The compressor 60 discharges compressed air into an air reserve tank 61 mounted on the chassis 10, and also into a secondary compression tank 62 for operation of usual air brakes, not shown, when the trailer A is so equipped. A gear-box control lever 63 provides for selective operation of the elevator 15 and conveyor 16 or the compressor 60, as required.

The water tank 14 is mounted to discharge into the discharge spout 17, and the slide valve 24, provided in the bottom of the tank 14, is adapted to be opened by an actuating lever 65 which in turn is controlled by a lanyard 67. By pulling the lanyard 67, the valve 24 may be opened, while a coil spring 68, mounted in compression between a bracket 69 on the discharge spout 17 and the lever 65, normally urges the valve 64 to closed condition. A filler opening 70 for the water tank is closed by a closure cap 71.

A flexible sleeve 73, of canvas or other suitable material, surrounds the lower end of the discharge spout 17 and is adapted to extend downwardly into the filling hopper 25 of a mixer, such as the truck B, so as to reduce air-borne losses of cement during the discharge of the contents of the trailer A into the mixer. The illustrated mixing truck B is of a conventional type, but, obviously, the type of mixer employed is not essential to the invention.

It is believed that the manner of using the invention will be obvious to anyone familiar with the requirements of the industry having read the foregoing description. Briefly, however, it is as follows:

During the time that a mixing truck A is at a batching plant being loaded with a batch of concrete mixing materials, the pre-batch trailer A also may be loaded with an auxiliary batch of concrete making material, with measured quantities of aggregate for such batch being loaded into the aggregate compartment 12, cement into the cement compartment 13, and water into the tank 14.

As illustrated, the king pin 28 is enaged by the "fifth wheel" 29 of the dirigible front wheel assembly C to convert the two-wheel trailer A to a four-wheel trailer. The tongue 31 may have usual, interlocking connection with the ball-type trailer hitch 32 for hitching the trailer A to the mixing truck B for towing.

The truck B may be used to tow the trailer A to the job site where the concrete is to be used. The trailer then is unhitched, and the truck discharges its cargo of mixed concrete in the usual manner. The truck B may then be backed up to the trailer A as illustrated in Fig. 1, and, by means of the engine 19, driving through the shaft 20, reduction gearing 21 and drive belt 23, the elevator 15 and conveyor 18 are operated simultaneously to discharge the contents of the aggregate compartment 12 and cement compartment 13 into the mixer B through the discharge spout 17, while at the same time valving a required quantity of water from the tank 14 by operating the lanyard 67.

A conventional gauge glass 74 is provided on the tank 14 within easy view of one operating the valve control lanyard 67 to permit accurate control of the amount of water discharged. Since the quantities of dry materials in the compartments 12 and 13 are carefully measured when the trailer is loaded, the required amount of water may be accurately valved to provide concrete of the consistency reqiured.

During the discharge of the contents of the trailer A into the mixer, the rotary drum 75 of the truck B is rotatively driven in a usual manner to mix the materials into concrete. The mixing truck B is then again driven to the point of use, where the second mixed batch of concrete thus provided is discharged. The truck B and trailer A then may be again coupled together and transported as a single unit back to the batch plant for refilling. Thus, upon each round trip of the mixer truck B to the job site, instead of delivering only the mixing truck load as in the past, the additional quantity contained in the trailer will also be carired and at a relatively small additional amount in either time or expense.

Since the trailer A preferably is provided with a conventional king pin arrangement of the type generally used on commerical highway trailers, it is, of course, capable of being hitched to any conventional tractor-type truck of the type used for towing such trailers. Therefore, if desired, additional trailers A may be loaded with pre-batch materials and hauled to the job site as required. Therefore, at a remote job site, a number of expensive mixing trucks could be replaced by the relatively inexpensive pre-batch trailers A without reduction in either the amount or quality of the concrete delivered.

The invention provides a simple and effective trailer for hauling pre-metered batches of concrete-making material without danger of contamination or intermixing of the various components of the batch during transport, and for discharging these materials simultaneously into a mixer. Use of the invention results in reducing the delivered price of concrete at a job site remote from a batching plant which supplies the batch materials.

While I have illustrated and described a preferred embodiment of the invention, it will be understood, however, that various changes and modifications may be made in the details thereof without departing from the scope of the invention as set forth in the appended claims.

Having thus described my invention, what I claim as new and desire to protect by Letters Patent is defined in the following claims.

I claim:

1. A pre-batch trailer for towing behind a loaded concrete mixing truck for transporting an extra pre-measured batch of concrete making material to a remote job site, and comprising a wheeled highway type trailer, a trailer hitch on the forward end of said trailer for towing connection to a concrete mixing truck, a box-like body on said trailer, said body being closed and sand-tight on its sides and bottom to provide an aggregate compartment, and of a size to receive therein a pre-measured quantity of sand and gravel for one batch of concrete for a towing, mixing truck, the bottom and sides of said compartment sloping convergently downward to a low point, a dust-proof, weather-proof cement compartment in said body of a size to receive therein a pre-measured quantity of cement proportionate to the sand and gravel for such batch of concrete and sealed off from the aggregate compartment therein, a separate filling opening in the top of the body for each compartment to receive said measured quantities from a batch plant, a discharge spout on the forward end of the body at a height to discharge into the loading opening of a concrete mixing truck used for hauling the trailer, power driven conveyor means in each compartment and extending from a low point therein to the discharge spout for discharging the contents of said aggregate and cement compartments simultaneously through the discharge spout, a prime mover mounted on the trailer and in controlled driving relation with each of said conveyor means, a water tank mounted on the body at a height to discharge the contents thereof by gravity into the discharge spout, a measuring gauge for indicating the water level in said tank, and valve means mounted to control the discharge of water from said tank through said spout and into a concrete mixing truck along with the contents of the aggregate and cement compartments.

2. A pre-batch trailer for towing behind a loaded concrete mixing truck for transporting an extra pre-measured batch of concrete making material to a remote job site, and comprising a wheeled highway type trailer, a trailer hitch on the forward end of said trailer for towing connection to a concrete mixing truck, a box-like body on said trailer, said body being closed and sand-tight on its sides and bottom to provide an aggregate compartment, and of a size to receive therein a pre-measured quantity of sand and gravel therein for one batch of concrete for a towing, mixing truck, the bottom and sides of said aggregate compartment converging downwardly to a low point, a dust-proof, weather-proof cement compartment in said body of a size to receive therein a pre-measured quantity of cement proportionate to the sand and gravel for such batch of concrete, and sealed off from the aggregate compartment therein, a separate filling opening in the top of the body for each compartment to receive said measured quantities from a batch plant, a discharge spout on the forward end of the body at a height to discharge into the loading opening of a concrete mixing truck used for hauling the trailer, a tunnel like enclosure extending from the low point of the aggregate compartment to the discharge chute, an elevator mounted in said enclosure for elevating aggregate from the bottom of the aggregate compartment into the discharge spout, conveyor means along the bottom of the cement compartment and terminating at the discharge spout for discharging the contents of the cement compartment through the discharge spout simultaneously with the discharge of the aggregate, controlled power drive means for actuating the elevator and conveyor means, a water tank mounted on the body, and means for discharging a measured quantity of water into the discharge spout along with the contents of the aggregate and cement compartments.

3. A pre-batch trailer for towing behind a loaded concrete mixing truck for transporting an extra pre-measured batch of concrete making material to a remote job site, and comprising a wheeled highway type trailer, a trailer hitch on the forward end of said trailer for towing connection to a concrete mixing truck, a box-like body on said trailer, said body being closed and sand-tight on its sides and bottom to provide an aggregate compartment, and of a size to receive therein a pre-measured quantity of sand and gravel for one batch of concrete for a towing, mixing truck, a dust-proof, weather-proof cement compartment in an upper portion of said body and sealed off from the aggregate compartment therein said cement compartment being of a size to receive therein a pre-measured quantity of sand and gravel for one batch of concrete for a towing, mixing truck, a discharge spout on the forward end of the body and at a height to discharge into the filler opening of a concrete mixing truck used for hauling the trailer, power driven conveyor means in each compartment for discharging the contents of said aggregate and cement compartments simultaneously through the discharge spout, a water tank mounted on the body of a size to contain an amount of water for mixing with pre-measured quantities of aggregate and cement in the body compartment to form concrete, and means for discharging a measured quantity of water from said tank through said spout along with the contents of the aggregate and cement compartments.

4. A pre-batch trailer for towing behind a loaded concrete mixing truck for transporting an extra pre-measured batch of concrete making material to a remote job site, and comprising a wheeled highway type trailer, a trailer hitch on the forward end of said trailer for towing connection to a concrete mixing truck, a box-like body on said trailer, said body being closed and sand-tight on its sides and bottom to provide an aggregate compartment, and of a size to receive therein a pre-measured quantity of sand and gravel for one batch of concrete for a towing, mixing truck, a dust-proof, weather-proof cement compartment in an upper portion of said body and sealed off from the aggregate compartment therein, said cement compartment being of a size to receive therein a pre-measured quantity of sand and gravel for one batch of concrete for a towing, mixing truck, a discharge spout on the forward end of the body and at a height to discharge into the filler opening of a concrete mixing truck for hauling the trailer, power driven conveyor means in each compartment for discharging the contents of said aggregate and cement compartments simultaneously through the discharge spout.

References Cited in the file of this patent
UNITED STATES PATENTS

| | | |
|---|---|---|
| 1,828,458 | Butler | Oct. 20, 1931 |
| 2,159,184 | Skrzynski | May 23, 1939 |
| 2,687,285 | Fisher | Aug. 24, 1954 |
| 2,800,312 | Ruby | July 23, 1957 |
| 2,811,268 | Kayser | Oct. 29, 1957 |

UNITED STATES PATENT OFFICE

CERTIFICATE OF CORRECTION

Patent No. 2,945,684 July 19, 1960

Robert B. Soldini

It is hereby certified that error appears in the printed specification of the above numbered patent requiring correction and that the said Letters Patent should read as corrected below.

Column 6, lines 6 and 34, after "quantity of", each occurrence, insert -- cement proportionate to the --.

Signed and sealed this 4th day of April 1961.

(SEAL)
Attest: ERNEST W. SWIDER

Attesting Officer

ARTHUR W. CROCKER
Acting Commissioner of Patents